UNITED STATES PATENT OFFICE.

C. L. FRINK, OF ROCKVILLE, CONNECTICUT, ASSIGNOR, BY MESNE ASSIGNMENTS, TO OSCAR T. EARLE.

IMPROVEMENT IN RUBBER PACKINGS.

Specification forming part of Letters Patent No. 54,523, dated May 8, 1866; reissue No. 4,942, dated June 11, 1872.

SPECIFICATION.

Specification describing certain Improvements in Rubber Packing, by C. L. FRINK, of Rockville, in the county of Tolland and State of Connecticut.

The nature of my invention relates to a new and improved composition for the manufacture of packing and for joints and valves exposed to the action of steam or other corrosive fluids, and which will be perfectly free from all adhesive properties. It consists of a combination of plumbago or other similar substance, used in the manufacture of rubber to give consistency, with rubber, sulphur, and metallic filings in such proportions that, after the mass is heated to a suitable vulcanizing temperature, it will form a refractory rubber compound capable of withstanding the action of acids and other corrosive fluids, and steam, and the vapor of other fluids at high temperatures.

In carrying out my invention I make a compound of India rubber, sulphur, plumbago or black lead, or other equivalent material usually mixed with rubber to give consistency, and add metal filings, (brass being used by preference.) The metal filings which I use in my composition I usually obtain from the pin-factories, but they may be prepared expressly for the purpose, according to the nature of the packing to be made.

The proportions of the ingredients may be varied to suit the nature of the valves to be made, but for ordinary purposes I have found the following proportions to answer well, viz.: rubber, ten parts by weight; plumbago, twenty parts by weight; carbonate of lead, or litharge, six parts by weight; sulphur, four parts by weight; brass filings, six parts by weight.

These ingredients are well mixed and incorporated in any convenient manner, and rolled into sheets or pressed into molds of proper shape. The mass is then vulcanized at a temperature ranging from the ordinary vulcanizing temperatures up to 300° Fahrenheit. Usually, for ordinary purposes, such as steam-packing, I use the high temperature of 300° Fahrenheit, or thereabout.

What I claim is—

A rubber compound made of the ingredients herein specified, for the purposes set forth.

CHRISTOPHER L. FRINK.

Witnesses:

CHAS. L. COOMBS,

W. HUAFF.